(12) United States Patent
Hattori

(10) Patent No.: US 8,185,887 B2
(45) Date of Patent: May 22, 2012

(54) SYSTEM AND METHOD FOR PRINTER DRIVER DISTRIBUTION WITH SEARCHABLE MAP DATABASE

(75) Inventor: Tomoki Hattori, Duluth, GA (US)

(73) Assignee: Ricoh Company, Ltd., Tokyo (JP)

( * ) Notice: Subject to any disclaimer, the term of this patent is extended or adjusted under 35 U.S.C. 154(b) by 1150 days.

(21) Appl. No.: 11/713,125

(22) Filed: Mar. 1, 2007

(65) Prior Publication Data

US 2007/0234354 A1 Oct. 4, 2007

Related U.S. Application Data

(63) Continuation-in-part of application No. 11/395,116, filed on Mar. 31, 2006, now Pat. No. 7,793,285.

(51) Int. Cl.
*G06F 9/44* (2006.01)

(52) U.S. Cl. ......... 717/174; 717/176; 717/177; 717/178

(58) Field of Classification Search .................. 717/178, 717/171, 173, 176, 177
See application file for complete search history.

(56) References Cited

U.S. PATENT DOCUMENTS

| | | | |
|---|---|---|---|
| 5,513,254 A | 4/1996 | Markowitz | |
| 5,642,205 A | 6/1997 | Kassmann | |
| 5,907,830 A | 5/1999 | Engel et al. | |
| 5,909,673 A | 6/1999 | Gregory | |
| 5,926,795 A | 7/1999 | Williams | |
| 6,075,971 A | 6/2000 | Williams et al. | |
| 6,118,546 A | 9/2000 | Sanchez et al. | |
| 6,243,172 B1 | 6/2001 | Gauthier et al. | |
| 6,313,921 B1 | 11/2001 | Kadowaki | |
| 6,336,098 B1 | 1/2002 | Fortenberry et al. | |
| 6,615,183 B1 | 9/2003 | Kolls | |
| 6,965,958 B1 * | 11/2005 | Sugiyama | 710/104 |
| 7,099,937 B1 * | 8/2006 | Ochiai et al. | 709/224 |
| 7,237,015 B1 * | 6/2007 | Ochiai et al. | 709/223 |
| RE39,801 E * | 8/2007 | Marbry et al. | 709/220 |
| 7,352,485 B2 * | 4/2008 | Kinoshita | 358/1.15 |
| 7,424,532 B1 * | 9/2008 | Subbiah | 709/226 |
| 7,640,554 B2 * | 12/2009 | Yamade | 719/327 |
| 2002/0010806 A1 * | 1/2002 | Yamade | 709/327 |
| 2002/0178051 A1 | 11/2002 | Golden et al. | |
| 2003/0053122 A1 * | 3/2003 | Kinoshita | 358/1.15 |
| 2003/0120624 A1 | 6/2003 | Poppenga et al. | |
| 2004/0001217 A1 * | 1/2004 | Wu | 358/1.15 |

(Continued)

FOREIGN PATENT DOCUMENTS

JP   9-66649   9/1997

OTHER PUBLICATIONS

Koo et al. "Location-based E-campus Web Service: From Design to Deployment", 2003.*

(Continued)

*Primary Examiner* — Phillip Nguyen
(74) *Attorney, Agent, or Firm* — Cooper & Dunham LLP

(57) ABSTRACT

Improved techniques which enable a user of an information terminal to select a printer for printing a print job are provided. Map images are provided to the user to aid in the selection of an appropriate printer. An appropriate printer driver corresponding to the selected printer, determined from printer information retrieved from a printer information database, is downloaded if necessary, and installed on the information terminal.

18 Claims, 13 Drawing Sheets

U.S. PATENT DOCUMENTS

| | | | |
|---|---|---|---|
| 2005/0012951 A1* | 1/2005 | Madril et al. | 358/1.13 |
| 2007/0024896 A1* | 2/2007 | Bounar | 358/1.15 |
| 2007/0233834 A1 | 10/2007 | Hattori et al. | |
| 2007/0245358 A1 | 10/2007 | Hattori et al. | |
| 2008/0235241 A1 | 9/2008 | Hattori et al. | |
| 2009/0059272 A1 | 3/2009 | Matsushita et al. | |

OTHER PUBLICATIONS

May 24, 2011 European search report in connection with counterpart European patent application No. 07 25 1462.

* cited by examiner

Fig. 2B
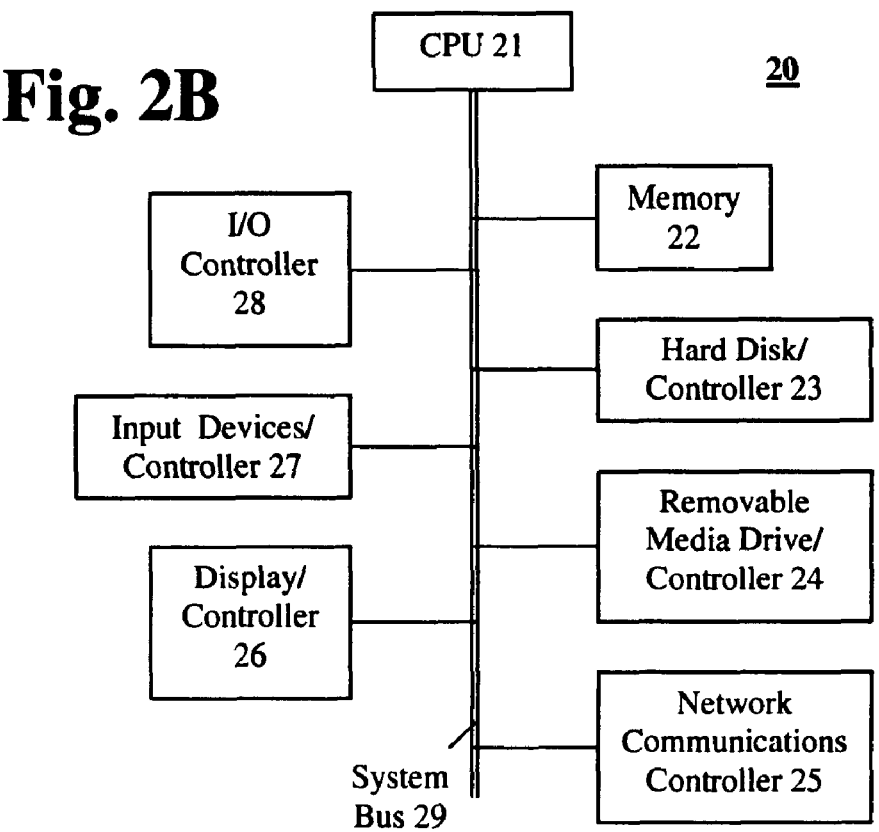
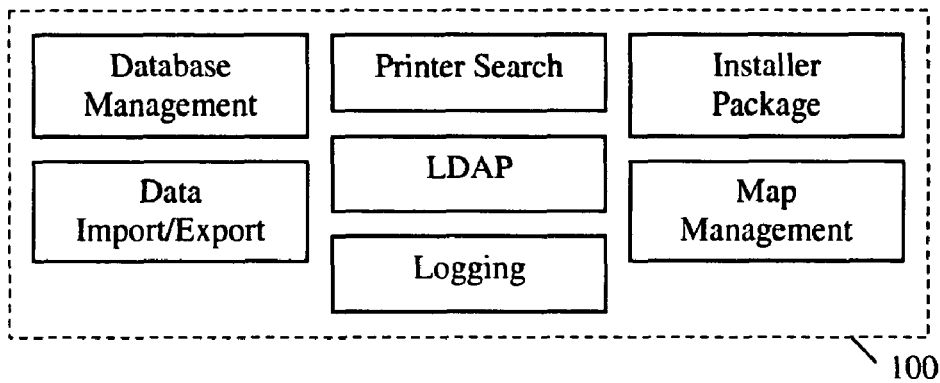
Fig. 10

| IP Address | Product Name | Color | Duplex | Location |
|---|---|---|---|---|
| 151.114.94.151 | LD127 | B/W | YES | |
| 151.114.94.156 | Aficio AP410N | B/W | | rhaudes's office |
| 151.114.94.157 | LP 020c | Color | | SVL2 |
| 151.114.94.159 | LD115 | B/W | | |
| 151.114.94.166 | 5635 | B/W | YES | |
| 151.114.94.167 | Aficio 1232C | Color | YES | across from Rob |
| 151.114.94.169 | LP125cx/LP126cn | Color | YES | test |
| 151.114.94.171 | LP335c | Color | YES | across from Terry |
| 151.114.94.176 | hp LaserJet 4345 mfp | B/W | ? | |
| 151.114.94.179 | LP127n/LP128n | B/W | YES | across from Mickey |
| 151.114.94.181 | Xerox WorkCentre Pro 45 | B/W | ? | 4667/1 TC |
| 151.114.94.189 | LP135n | B/W | YES | across from Mickey |
| 151.114.94.200 | Aficio AP3200 | B/W | YES | |

| Check | HostName | IPAddress | sysContact | sysLocation |
|---|---|---|---|---|
| ☑ | 151.114.94.171:161 | 151.114.94.171:161 | terry | across from Terry |
| ☑ | 151.114.94.24:161 | 151.114.94.24:161 | Administrator | Unknown |
| ☑ | 151.114.94.90:161 | 151.114.94.90:161 | (null) | (null) |
| ☑ | 151.114.94.210:161 | 151.114.94.210:161 | "System administrator" | "System administrators office" |
| ☑ | 151.114.94.59:161 | 151.114.94.59:161 | daniel | across from Daniel |
| ☑ | 151.114.94.99:161 | 151.114.94.99:161 | System administrator | System administrators office |
| ☑ | 151.114.94.151:161 | 151.114.94.151:161 | (null) | (null) |
| ☑ | 151.114.94.167:161 | 151.114.94.167:161 | rob | across from Rob |
| ☑ | 151.114.94.169:161 | 151.114.94.169:161 | uli | test |
| ☑ | 151.114.94.156:161 | 151.114.94.156:161 | robert | rhaudes's office |
| ☑ | 151.114.94.179:161 | 151.114.94.179:161 | mickey | across from Mickey |
| ☑ | 151.114.94.189:161 | 151.114.94.189:161 | mickey | across from Mickey |
| ☑ | 151.114.94.157:161 | 151.114.94.157:161 | larry | SVL2 |
| ☑ | 151.114.94.159:161 | 151.114.94.159:161 | (null) | (null) |
| ☑ | 151.114.94.202:161 | 151.114.94.202:161 | (null) | (null) |
| ☑ | 151.114.94.10:161 | 151.114.94.10:161 | (null) | (null) |
| ☑ | 151.114.94.205:161 | 151.114.94.205:161 | (null) | (null) |
| ☑ | 151.114.94.166:161 | 151.114.94.166:161 | (null) | (null) |
| ☑ | 151.114.94.176:161 | 151.114.94.176:161 | (null) | (null) |
| ☑ | 151.114.94.36:161 | 151.114.94.36:161 | unknown | unknown |
| ☑ | 151.114.94.5:161 | 151.114.94.5:161 | NULL | NULL |
| ☑ | 151.114.94.97:161 | 151.114.94.97:161 | uli | Uli's office |
| ☑ | 151.114.94.200:161 | 151.114.94.200:161 | (null) | (null) |
| ☑ | 151.114.94.41:161 | 151.114.94.41:161 | (null) | HP 320 Copier in main hall |
| ☑ | 151.114.94.4:161 | 151.114.94.4:161 | (null) | (null) |
| ☑ | 151.114.94.3:161 | 151.114.94.3:161 | (null) | (null) |
| ☑ | 151.114.94.2:161 | 151.114.94.2:161 | Larry Long | Atlanta Technology Center |
| ☑ | 151.114.94.181:161 | 151.114.94.181:161 | Larry Long:770-493-2388;466 | 4667/1 TC |
| ☑ | 151.114.94.23:161 | 151.114.94.23:161 | Me<me@somewhere.org | Right here. right now. |

[ Search ] [ Update ] [ Convert ] [ Clear ]

Fig. 4D

Fig. 6A
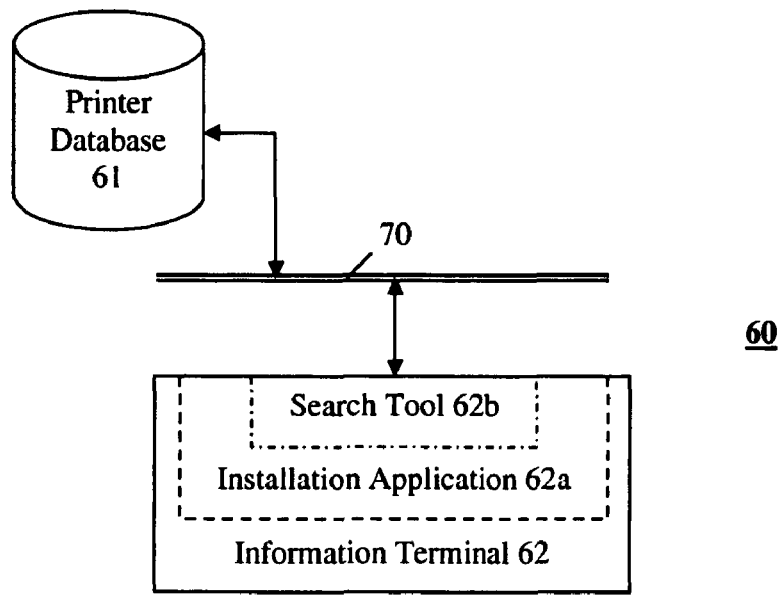
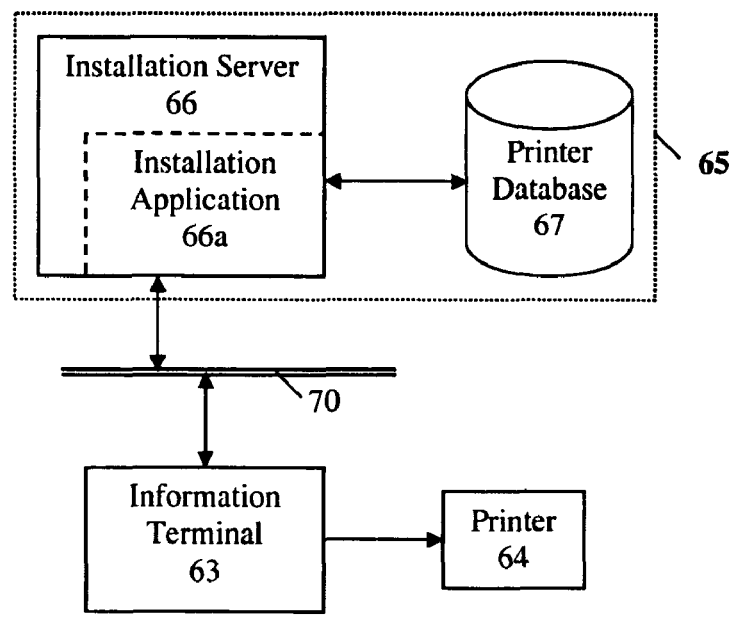
Fig. 6B

Fig. 6C
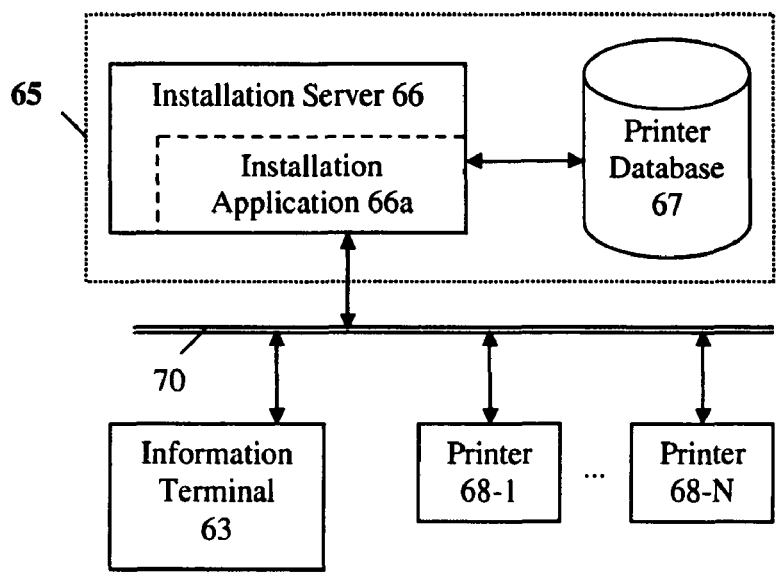
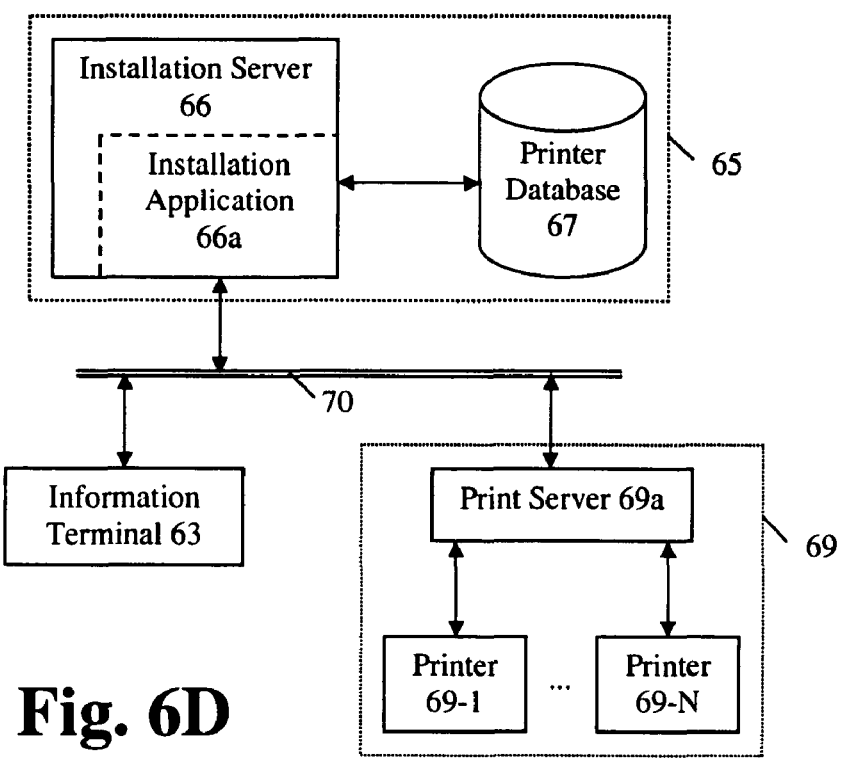
Fig. 6D

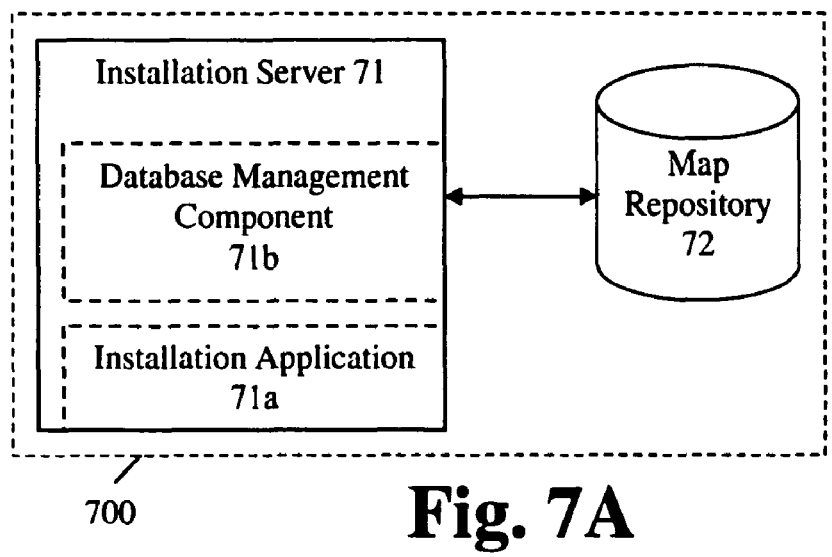
Fig. 7A
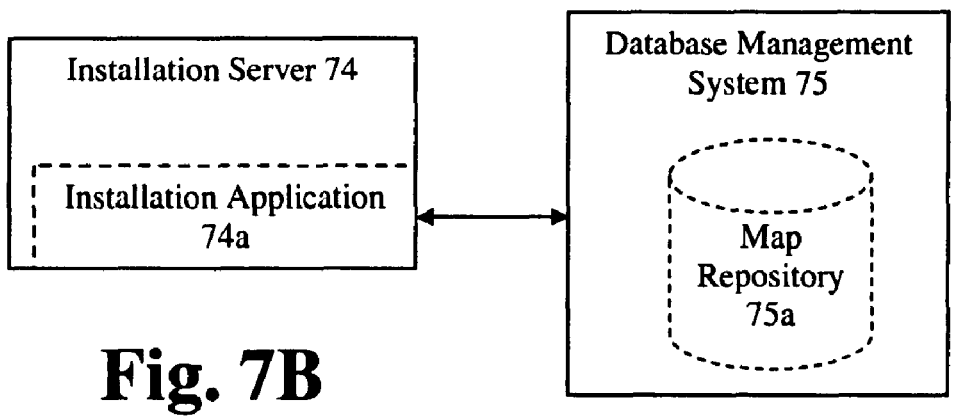
Fig. 7B
Fig. 7C
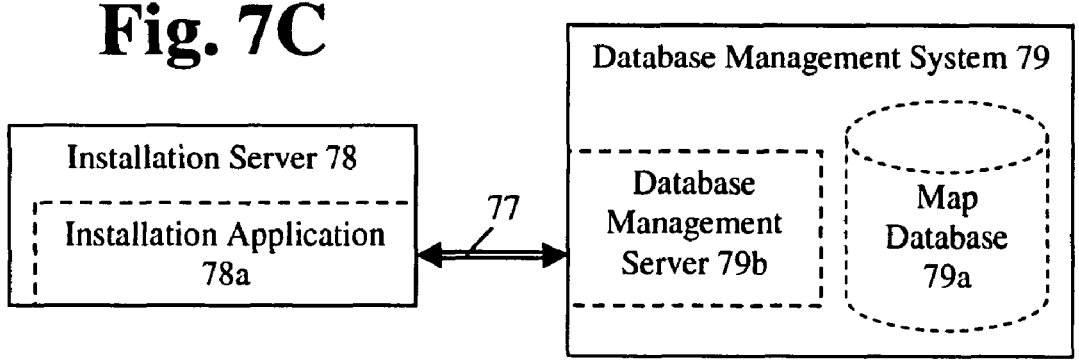

SYSTEM AND METHOD FOR PRINTER DRIVER DISTRIBUTION WITH SEARCHABLE MAP DATABASE

CROSS-REFERENCE TO RELATED APPLICATION

This application is a continuation-in-part of U.S. patent application Ser. No. 11/395,116, filed Mar. 31, 2006 and entitled "WEB INSTALLER DRIVER", now U.S. Pat. No. 7,793,285 issued on Sep. 7, 2010, the entire contents of which are incorporated by reference herein.

TECHNICAL FIELD

This application relates to systems and methods for printing. In particular, the application relates to such systems and methods wherein map images which show the locations of printers near a specified position are provide to enable a user to select an appropriate printer for printing a print job.

DESCRIPTION OF RELATED ART

In the current information age, there are often discussions of the desirableness of a paperless society. However, notwithstanding such discussions, there remains a great need by users of computers and information terminals for printing functionality. Therefore, devices having printing functionality, such as printers, copiers, multi-function devices, etc., continue to play a significant role in information technology (IT) at home and at work.

A computer or information terminal typically needs printer driver software in order to communicate properly with a printing device. A printer driver generally provides a software interface that allows the operating system and software applications running on the computer or information terminal to interface functionally with the printing device. For example, the printer driver software may match standardized commands from the computer's operating system to specific capabilities of the printing device.

Printer driver software is typically stored on a floppy diskette or other portable storage medium packaged with a peripheral device, for installation on a computer or information terminal which will be communicating with the peripheral device. Different printer drivers may be provided for different computer configurations (for example, different operating system versions may require different drivers). Additionally, for many printing devices different drivers are required to support different feature sets. Printers may have, for instance, one driver that supports a set of languages, and a different driver may be required for support of other languages. Likewise, if the user wishes to utilize a special math character set, a particular driver may be required.

The set of printing devices and functionalities available to a user can change over time because printing devices can be replaced or updated. In addition, the current trend is that more and more of the computers and other information terminals which can access the peripherals are mobile. Therefore, the number and functionality of printing devices available to a user can vary depending on the location of the computer or information terminal used by the user at that moment. For example, when the computer or information terminal is connected to a network, the user may access any of various printing devices connected to the network, assuming the user has access rights to the device. In many instances, a user finds a need to install additional printer driver software.

However, obtaining the appropriate printer driver software and properly installing it may be challenging tasks, even to an IT administrator, for various reasons.

Printer driver software is often stored on a floppy diskette or other portable storage medium packaged with a printing device, for installation by the user on a computer which will be communicating with the printing device. Different printer drivers may need to be installed for different computer configurations. For many printing devices, different drivers are required to support different feature sets. For instance, one driver may support a set of languages, and a different driver may be required for other languages. Likewise, if the user wishes to utilize a special math character set, a particular driver may be required.

When plural drivers are available for a printer, the "best" driver may vary from one computer to the next (and sometimes, in the case of a shared computer, from one user to the next), depending on the computing environment and criteria for selection. For example, some users or computers may only use limited features. In such instances, it may be desirable to choose the driver that is easiest to obtain and install. Other users or computers may require advanced functionality and therefore the most recently released and robust driver version would be desirable regardless of the difficulty of obtaining and installing it. The task of choosing a suitable driver from plural available drivers can be difficult, even for an administrator, when there is little information readily available to distinguish the different drivers. In some instances, the printer driver software stored in a storage medium is an old, obsolete version, has unresolved bugs, and/or only has limited functionality.

In other instances, problems arise from the user performing an improper operation in installing the printer driver, such as when the printer driver software includes printer drivers for several different printing devices and/or if the user is required to make certain selections or settings during installation of the printer driver.

More recently, manufacturers have provided on-line access to printer driver software. Typically, a manufacturer makes a "library" of printer drivers available on the web site of the manufacturer, and a user can access the web site and download a desired driver. However, while a multiplicity of drivers may be available from the web site, they are not presented in a user-friendly way, such that the user can compare the multiple printer drivers and their respective function sets. The user is often required to investigate the functions of each printer driver by navigating to the web page corresponding to the printer driver. Further, selecting appropriate printer driver software may involve many interactive steps which open up the possibility of the user making errors in the process. Installation of the appropriate printer driver through the conventional Internet-based driver delivery system is simply not user-friendly.

In addition, conventional IT systems often do not provide a user friendly system for a user at an information terminal to find the appropriate or desired printer (particularly when the information terminal has been moved from its usual location to a new or different location. For example (FIG. 1), when a user invokes a print function, the user interface of the conventional system displays a list of printers. However, the list of printers is fixed, regardless of the location of the information terminal, and is not dynamically updated to include newly added printers or exclude printers that have been moved elsewhere or removed from the network altogether.

An improved approach for a user to select an appropriate printer to which a print job can be sent is needed.

SUMMARY

This disclosure provides improved techniques wherein map images which show the locations of printers near a specified position are provided, to enable a user of an information terminal to select a printer for printing a print job. Such techniques may be embodied in computer software (for example, a printing application, an installation application, a printer driver, etc.).

A map management part retrieves, based on a specified position, a map image from a map repository storing a plurality of map images, and retrieves printer location information for one or more printers from a printer information database which stores printer information corresponding to a plurality of printers, including location information for the plurality of printers.

Icons can be dynamically placed on the map image based on the locations of the one or more printers. A user selects one of the printers through a user interface. If necessary, an appropriate printer driver corresponding to the selected printer, determined from printer information retrieved from the printer information database, is downloaded and installed on the information terminal.

A system and a method for printing over a network having similar features are also provided.

BRIEF DESCRIPTION OF THE DRAWINGS

The features of the present disclosure can be more readily understood from the following detailed description with reference to the accompanying drawings wherein:

FIG. 2B shows a block diagram of an informational terminal;

FIGS. 4A through 4E show user interface windows, according to examples of the present disclosure;

FIGS. 6A through 6D show block diagrams of respective systems for installing a printer driver on an information terminal through a network, according to some examples of the present disclosure;

FIGS. 7A through 7C show block diagrams of respective systems for installing a printer driver on an information terminal through a network, according to some additional examples of the present disclosure;

FIG. 10 shows a schematic representation of a web-based installation application, according to an example of the present disclosure.

DETAILED DESCRIPTION

Figure 1:
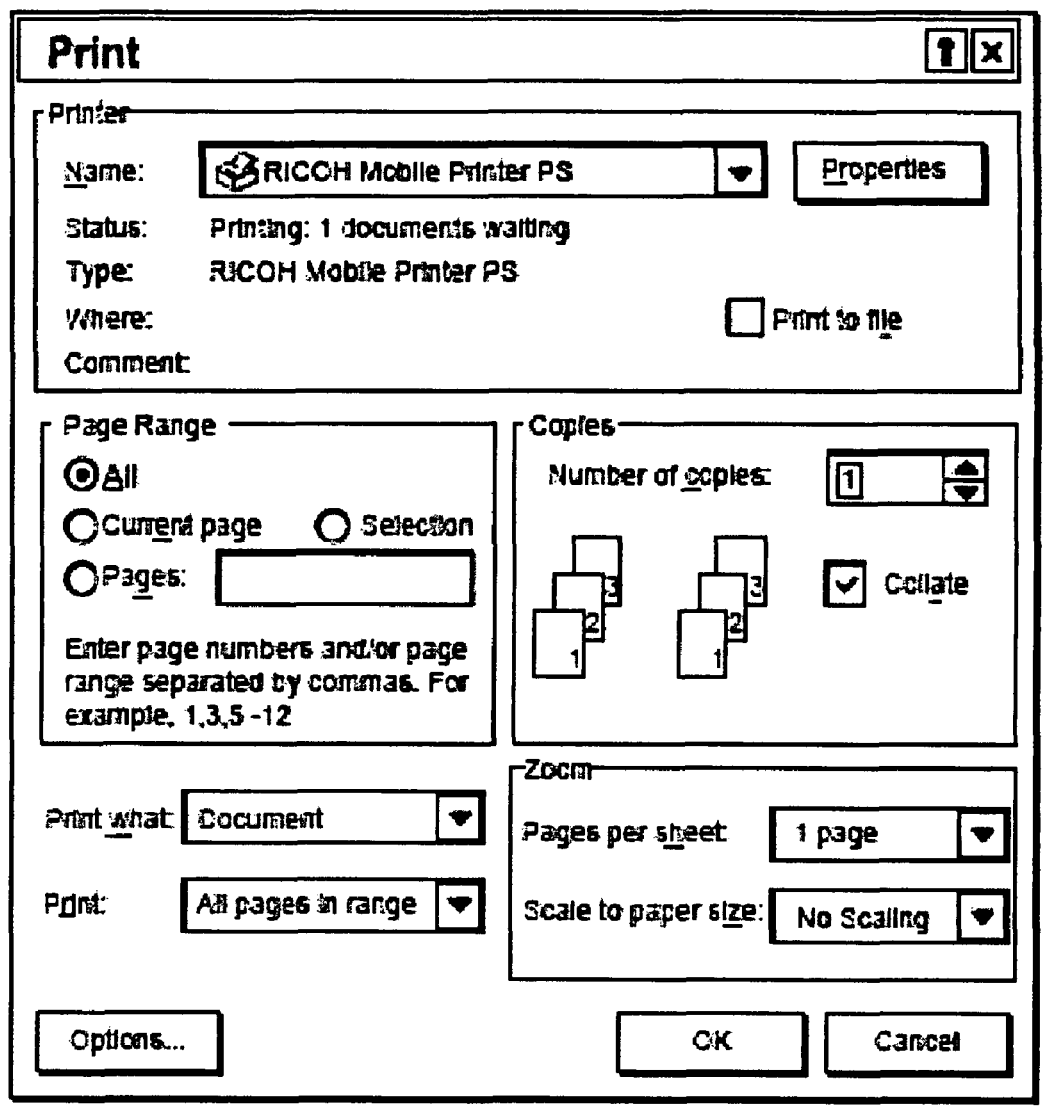
FIG. 1 shows a conventional user interface window for selecting a printer to print a print job.

In describing preferred or exemplary embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner.

Figure 2A:
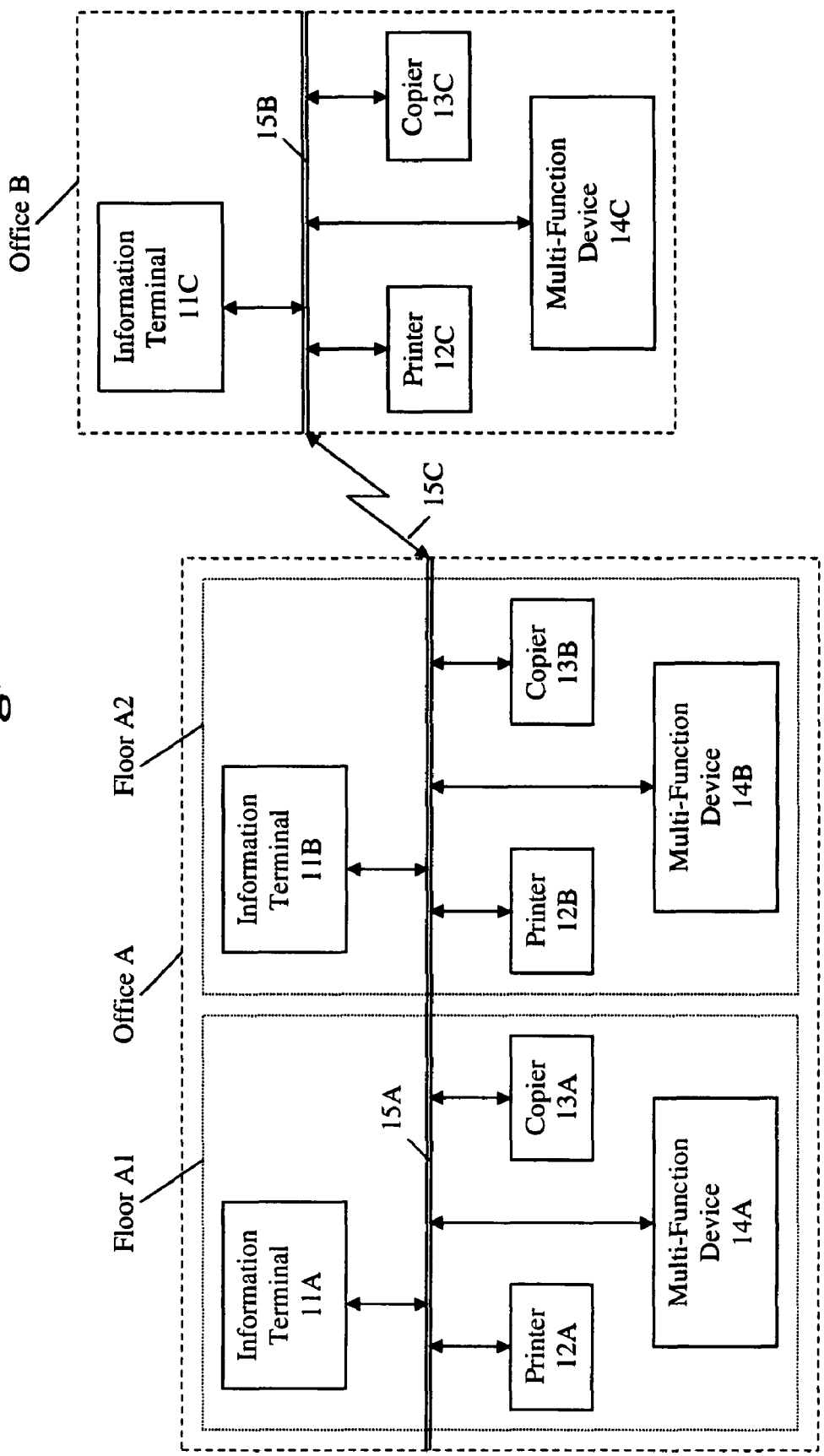
FIG. 2A shows a schematic diagram of a printing system which can be configured according to the present disclosure.

FIG. 2A shows an example of a printing system in which information terminals are interconnected with printing devices through a network connection. The example of FIG. 2A corresponds to an exemplary IT environment of an enterprise (for example, a corporation or other commercial enterprise, or another organization, such as a governmental agency, other public or private organizations, etc.).

The enterprise of FIG. 2A includes multiple offices, including office A and office B. IT components in offices A and B are interconnected by subnetworks 15A and 15B. Subnetwork 15A is connected with subnetwork 15B through subnetwork 15C (which include, for example, the Internet). Each of subnetworks 15A through 15C can include one or a combination of wired or wireless networks. The subnetwork 15A through 15C (as well as possibly other subnets) jointly constitute an enterprise network (not identified in FIG. 2A).

It should be understood that office A need not be geographically near office B. Thus, offices A and B can be in different continents, countries, states, districts, cities or towns (or on the other hand, they can be adjacent to each other). However, the subject matter of this disclosure provides a user with a graphical view, via map images, of printing resources proximate to a specified geographical location. Thus, the user can select an appropriate or desired printer to which a print job is sent, regardless of whether the user is at the user's home office, or at an office the user is visiting.

In the example of FIG. 2A, office A includes multiple floors, including floor A1 and floor A2 (and can include many additional floors). On floor A1, information terminal 11A, printer 12A, copier 13A and multi-function device 14A are interconnected through network 15A. Similarly, information terminal 11B, printer 12B, copier 13B and multi-function device 14B, on floor A2, are interconnected through network 15A. Information terminal 11A can access the printing devices on floor A2 (for example, printer 12B, copier 13B, multi-function device 14B, etc.), as well as the printing devices on floor A1 (for example, printer 12A, copier 13A, multi-function device 14A, etc.). Similarly, information terminal 11B can access the printing devices on floor A1 (for example, printer 12A, copier 13A, multi-function device 14A, etc.), as well as the printing devices on floor A2 (for example, printer 12B, copier 13B, multi-function device 14B, etc.).

In office B, information terminal 11C, printer 12C, copier 13C and multi-function device 14C are interconnected through network 15C. It should be appreciated that while information terminal 11C, printer 12C, copier 13C and multi-function device 14C are shown in FIG. 2A, office B may include many more terminals and printing devices. Similarly, office A can include many more terminals and printing devices, other than those shown in FIG. 2A. Indeed, the printing system of this disclosure is preferably configured to be scalable such that terminals (and printing devices) can be added to the system as desired and needed.

Although the enterprise environment of FIG. 2A is explained above as an example of an IT environment in which the subject matter of this disclosure can be applied, it should be appreciated that the subject matter of this disclosure can also be applied in other network printing environments in which a plurality of printing devices are available for printing from an information terminal.

The term "printer" or "printing device" as used herein, including in the appended claims, is used generically to include any output device having printing or plotting functionality, and includes multi-function devices having copy and/or scanning functions in addition to the printing or plotting functions.

The term "information terminal" as used herein includes any of the various conventional devices which have a need to print on demand, such as personal computers, laptop or notebook computers, workstations, other types of computers, PDAs, other information appliances, etc.

An exemplary configuration of an information terminal is shown in FIG. 2B. Information terminal 20 includes CPU 21, memory 22, hard disk (and controller) 23, network communications controller 25 (for communications through a wired or wireless network), display (and controller) 26, one or more input devices (and controller) 27, I/O controller and optional removable media drive (and controller) 24, all of which are connected through system bus 29.

Each information terminal connected to the network can preferably be configured with software to allow the user of the terminal to view printer properties information, including printer location information, for a list of printers connected to the network. For example (FIGS. 3A through 3C), an information terminal can be configured through software to include apparatus 30 which comprises a printer information obtaining part 31 and a user interface 32. Such software can be, for example, a printer driver or printing application downloaded to the information terminal through a network connection or via removable media (for example, floppy diskette, optical disc, other media, etc.).

The printer information obtaining part 31 searches for printers on a network, and communicates with the printers on the network to obtain printer properties information from the printers. For example, many printers store printer data, such as its attributes or printer properties information, in a Management Information Base (MIB). The MIB may conform with the SNMP (Simple Network Management Protocol) protocol, and printer properties information can be obtained from the MIB through SNMP queries. As another example, the printers on the network can be discovered by broadcast of SNMP messages over the network and then waiting for particular responses from printer devices.

Figure 3A:
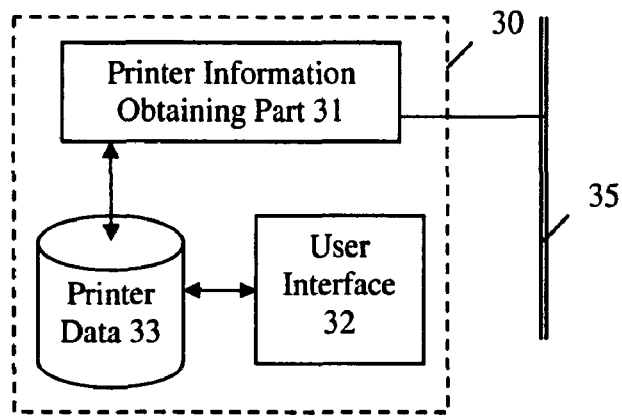
FIGS. 3A through 3C show block diagrams of software-configured apparatuses which can be implemented on an information terminal, according to some examples of the present disclosure.
Figure 3B:
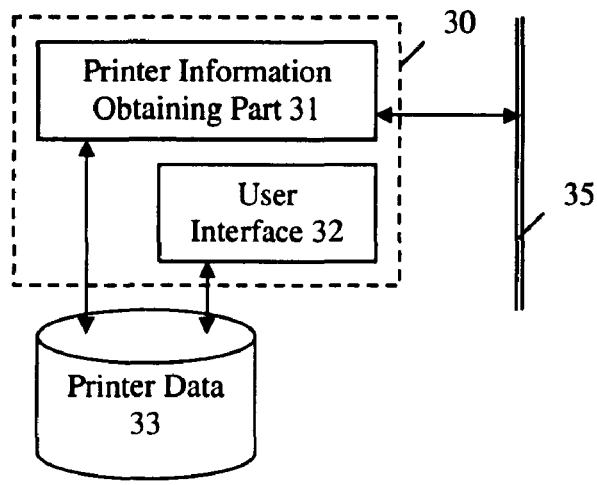
Figure 3C:
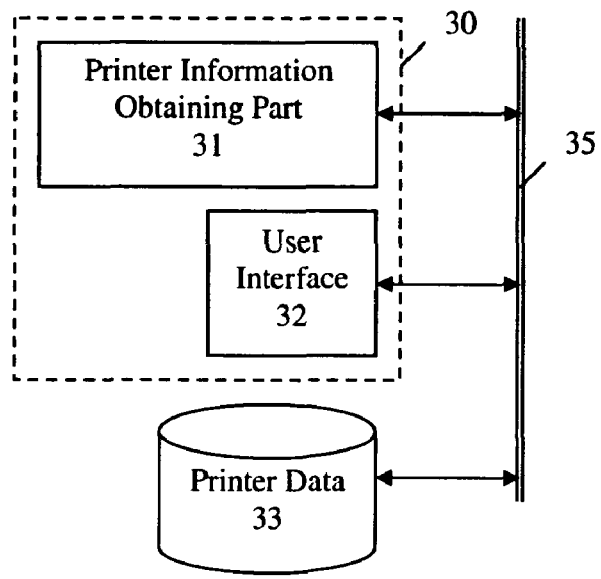

The printer information obtained by the printer information obtaining part 32 can be stored along with other printer data 33 in the information terminal (FIG. 3A). Alternatively, the printer data can be stored external to the information terminal and retrieved (for example through the network) as needed (FIGS. 3B and 3C).

Preferably, a user interface window is provided to edit the stored printer data. FIG. 4D shows an example of a scrollable window in which the printer data is presented as a table of entries. The user can edit the information in FIG. 4D, including activate or deactivate (by checking or unchecking) an entry. When a search is to be performed, the entries in the stored printer data can be consulted before the search is performed. In addition, the user can manually enter an entry. The search can update an entry or populate an entry with additional information.

The user interface 32 presents printer properties information, to inform the user of the features of printers available for selection by the user. The information presented by the user interface can include any of the printer properties information that would be useful to a user for deciding the printer to select for a print job. Some exemplary printer properties information which can be presented by the user interface, include, for example (FIG. 4B), printer product name, color printing, duplex printing, printer location (for example, country, city, building, floor, office name), etc. The printer location information can be represented textually as well as on map images as discussed below. Additional printer properties information can be presented, such as printing speed (for example, 16 pages per minute), paper sizes (for example, Letter/Legal/11× 17), asset number (for example, used by some organizations to identify the IT asset), etc. The term "printer properties information" used herein, including in the appended claims, refers to any of the above-mentioned printer properties information as well as other printer properties information that does not constitute a printer name of a specific printer.

The user interface may further include a configuration view for configuration of the information to be displayed.

Figures 4A, 4B:
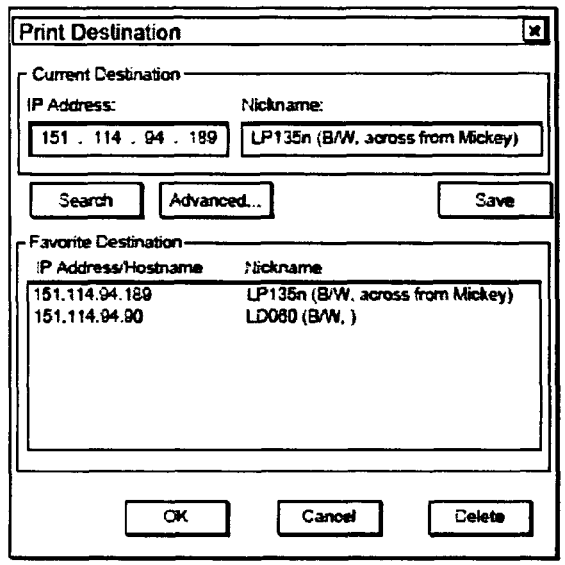

The user interface 32 can include a window or panel for the user to request a search for printers on the network (for example, search button in FIG. 4A). Such a user interface window may allow the user to specify a desired printer property (for example, printer location) and request search for a printer having the specified printer property.

Figure 4C:
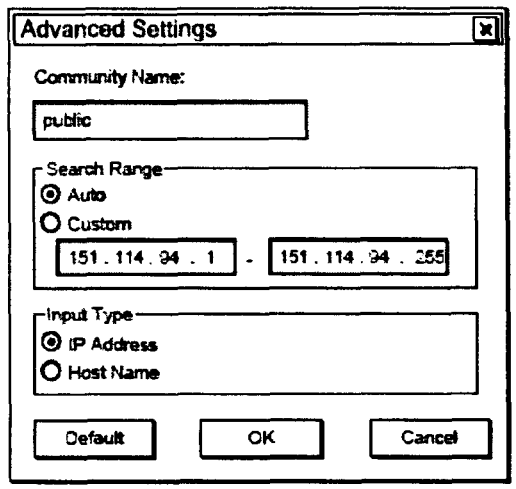
Figure 4E:
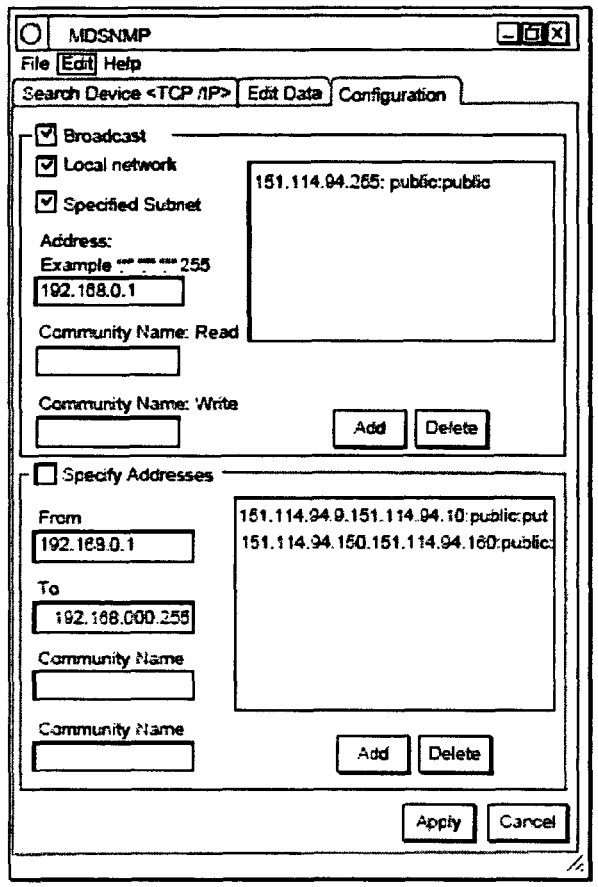

The user interface may allow the user to limit the search to a particular search range on the network (see, for example, FIG. 4C). For example, the user interface may allow the user to specify manually a range of network addresses (for example, IP addresses), such as 151.114.94.1-151.114.94.255. The manually specified range can also be saved and used as the default for the next search. In another example, the search range may be configured automatically, such as to the local subnet. The user interface preferably allows the user to select manual configuration, auto configuration or default configuration (for example, Default button in FIG. 4C) of the search range. For example, the user may normally (that is, when the user is in his/her home office) use default configuration, but select auto configuration when visiting another office. FIG. 4C shows an exemplary user interface window which presents an advanced settings view for selecting auto configuration of the search range or manually specifying the search range.

In addition, the search may further be limited by community name. The user can specify community name to access printers that have limited access (for example, access to some color printers or high-throughput printers may be limited to those who are authorized to use, and/or know the password for, the printer). FIG. 4C shows an exemplary user interface window which presents an advanced settings view wherein a community name can be specified for the search.

Thus, the user interface can include one or more configuration view for specifying parameters of the search, and the specified parameters can be stored as a configuration. Preferably, multiple configurations can be stored, and one of the configurations can be selected before a new search is performed. For example, an exemplary configuration may be to search by location only, auto-configuration of range, and default SNMP settings. Another configuration may be to search by location and for color printing, manual specification of range, and special SNMP settings. The selection of configuration may be manual or automatic (for example, according to location or network information, or according to user information).

An information terminal might track its own location (for example, using a Global Positioning System card) and provide such location information. Alternatively, location information may be extrapolated from locations of routers, locations provided by wireless networks or other wireless technologies (such as RFID). The terminal location information may be used to configure the search or select a stored configuration.

Figure 5:
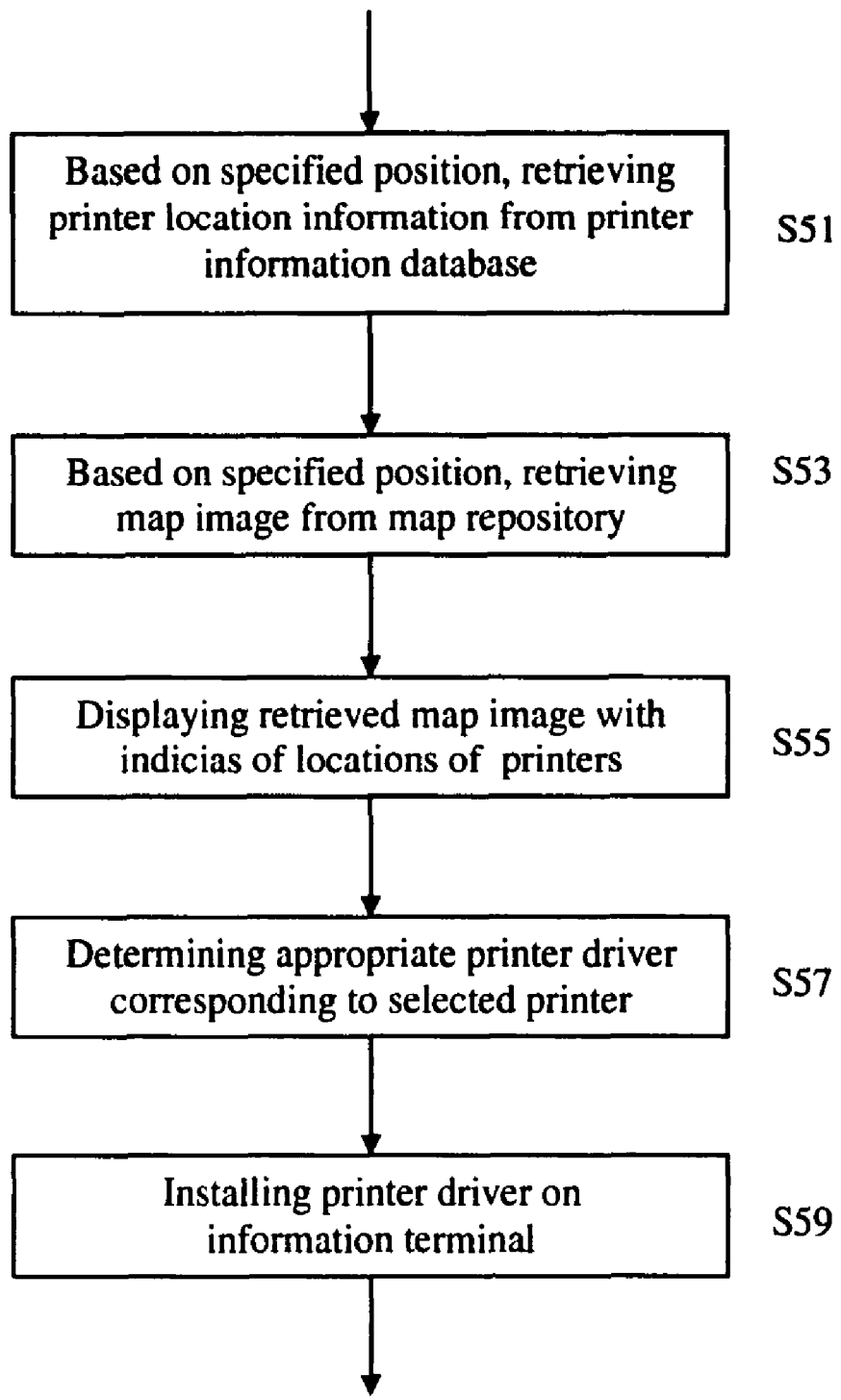
FIG. 5 shows a flow chart of a work flow for selecting a printer for printing over a network, according to an example of the present disclosure.

A method for installing a printer driver on an information terminal through a network, according to an example of this disclosure (FIG. 5), is discussed below.

Based on a specified position, printer location information for one or more printers is retrieved from a printer information database storing printer information corresponding to a plurality of printers, including locations of the printers (step S51). In addition, based on the specified position, a map image is retrieved from a map repository storing a plurality of map images (step S53). The retrieved map image is displayed with indicia on the map image of the locations of the respective one or more printers (step S55). As mentioned above, it may often be the case that when a printer is selected at the information terminal, an appropriate printer driver for the selected printer will need to be installed on the information terminal. In such instances, there may also be a need to determine an appropriate printer driver corresponding to a selected printer for the information terminal and download the appropriate printer driver (step S57). The printer driver is installed on the information terminal (step S59). Such a method allows the user to have a graphical map view of choices of printers that the user can use.

Additional features may be provided to enhance the utility of the method.

For example, the method may be implemented through a web based driver installer which can add map images into the map repository, and the map images can be associated with user-defined keys. Another useful feature is maintaining a hierarchical structure of map information, and searching for the appropriate map image based on the hierarchical structure. AS an example, the map images may be organized with State as one level of the hierarchy, city as another level, building as a third level, floor as a fourth level, etc.

In addition, the map images can be loosely or tightly coupled to the printer location information. For example, the driver installer can automatically communicate with the printers directory or printer information database to retrieve printer location information, or can communicate directly with printers or devices attached to the printers, such as GPS, RFID or other position locator devices. Icons can be dynamically placed on the map image as the indicia of the locations of the printers, based on the retrieved printer location information. Thus, if, for example, printer A which used to be in office Z has been moved to office Y, the displayed images are automatically updated showing printer A on a map of office Y, but not on a map of office Z.

The driver installer can maintain groupings of the printers according to respective network addresses of the printers, and associate the location information with a corresponding grouping. For example, the groupings can be formed based on network router information and where the printer network address are under a router.

Further, the driver installer can dynamically create user interface that allows a user to search printer information associated with the map images. In an example in which some map images in the map repository are on a state-level, other map images are on a city-level, additional map images are on a building-level, the user can add country keys and register the country-level map images with the country keys. In such an example, the printer search user interface can show country-level map images first, followed by other levels based on user selection of a country (for example, the user interface next displays state-level map images).

The map images need not be limited to being from a single map repository. The driver installer can communicate with different mapping servers through web services, send location information, and display map images from other mapping systems. For example, the printer icon can be displayed on map images from a Goggle map service, Yahoo map service, MapQuest map service, etc.

FIGS. 6A through 6D show examples of systems for installing a printer driver through a network connection.

System 60 shown in FIG. 6A includes a printer database 61 and an installation application 62*a* which resides natively on an information terminal 62 connected to the database 61 through network 70. The database 61 may be the central component of a database management system which is network-enabled. The network 70 may be one or a LAN (local area network), WAN (wide area network), the Internet, another type of network, or any combination thereof.

The installation application 62*a* can include a search tool 62*b*, and is configured to transmit a query through the network 70 to search for and find in the printer database 61 printer information of a printer matching a search key. Further, the installation application 62*a* utilizes the driver information corresponding to the printer to download a corresponding printer driver and driver installer to the information terminal 62 through the network 70, and apply the downloaded driver installer to install the printer driver on the information terminal.

The printer database 61 may store the printer drivers and corresponding driver installers, or links or URLs (uniform resource locators) to the printer drivers and driver installers. In the case that the printer driver and corresponding installer are stored in the database, the printer driver and installer are retrieved from the database and downloaded to the information terminal, and the downloaded installer is executed to install the retrieved printer driver on the information terminal. On the other hand, if links or URLs to the printer driver and corresponding installer are stored in the database, the links or URLs are utilized to download the printer driver and installer to the information terminal, and the downloaded installer is executed to install the retrieved printer driver on the information terminal.

FIGS. 6B through 6D show different examples wherein the installation application is provided through a client-server configuration. System 65 includes an installation server 66 and a printer database 67. The printer database 67 stores printer information for a plurality of printers, including (but not limited to) corresponding printer drivers and printer driver installers. The server 66 provides an installation application 66*a* on demand from a remote client terminal 63 connected to the server 66 through a network 70. As an example, the network 70 may include the Internet, and the installation application 66*a* may be provided by the server 66 as a web service to the remote information terminal through the network 70. As another example, the network 70 may include an Intranet, and the installation application 66*a* may be provided by the server 66 as a network service to the information terminal. In any event, the installation application 66*a* preferably includes a driver search tool (not shown) to search in the printer database 11*b* for a suitable printer. The printer may be, for example, local printer 64 (FIG. 6B), any of the network printers 68-1 to 68-N (FIG. 6C), or any of the printers 69-1 to 69-N serviced by print server 69*a* in printer management system 69 (FIG. 6D).

Although the examples of FIGS. 6B-6D show the systems in a client-server configuration, it should be appreciated that the installation application can be provided via another type of network-connected configuration (such as a peer-to-peer configuration). In any event, the use of client-server systems (and peer-to-peer systems) for delivery of applications is well-known, and therefore a detailed discussion is omitted in the interest of clarity and brevity.

It should be apparent that the examples of FIGS. 6A through 6D can be modified according to the features described herein to provided systems for installing a printer driver through a network connection which is supplemented with image images showing indicia of the locations of the printers. Such systems include a map repository, with the printer database 61 being part of the same database management system or a different database management system.

The driver installer application and map database may be adapted for any of various system configurations. In one example (FIG. 7A), map database 72 is maintained and serviced by a Web server 700 which includes an installation server 71 running an installation application 71a and a map management component 71b for accessing the database 72 to store, update, search and delete (as well as perform other operations on) the map data stored in the map database 72. The installation application 71a accesses map data through the map management component 71b.

In another example (FIG. 7B), map database 75a is managed by a database management system 75 which maintains the map database 75a. The installation application 74a, provided by server 74, accesses the printer data by communicating with the database management system 75 through an established protocol (for example, ODBC—Open DataBase Connectivity, a standard database access method), to perform operations (such as store, update, search, delete, etc.) on the data in the database 75a.

A single server may perform the function of an installation server as well as the function of database management (for example, FIG. 7A). Alternatively, a separate server 79b may be provided in database management system 79 to service requests to access map database 79a (for example, FIG. 7C). Installation application 78a of installation server 78 may communicate with the database management server 79b through a network 77.

The installation application preferably includes an easy-to-use user interface which displays assorted printer information. The user may be provided with means for selecting a simple display with a few printer information fields or an advanced display with many more printer information fields.

In addition, a configuration tool (for example a pull-down menu) may be provided for customizing the printer information displayed by the user interface (for example, each field which the user wishes to display). As an example, the configuration tool may be used to customize the user interface to show, for each printer, whether the driver installer is to set the printer as the default printer (if the printer information in the printer database for a specified printer includes an indication that the printer is to be set as default printer, when the installer installs the corresponding printer driver on the information terminal, the printer is set to be the default printer for the information terminal). The user may save the setting such that the same setting can be applied in subsequent sessions of use of the installation application. The user interface setting may default to a user or group setting.

Figure 8:
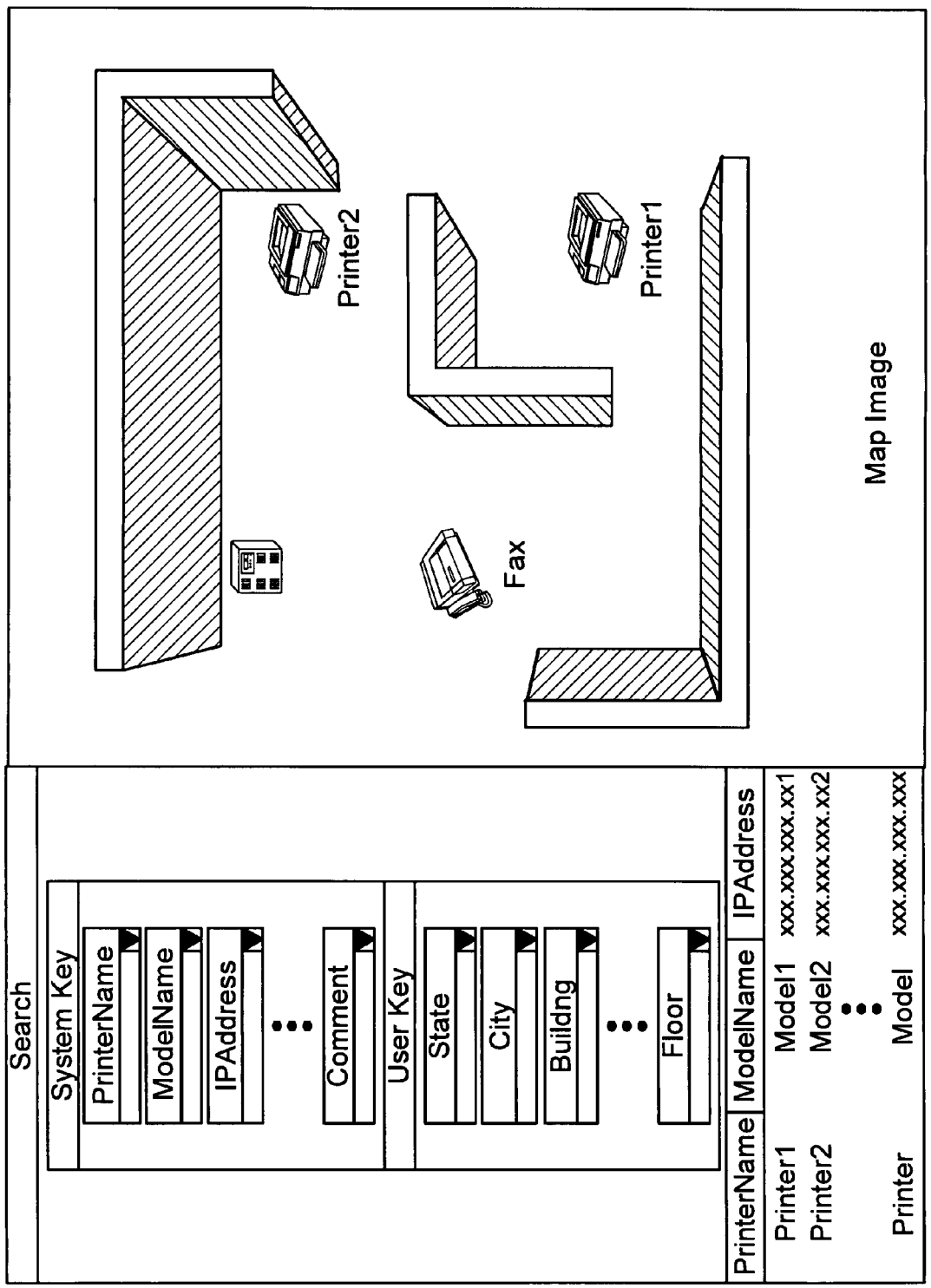
FIG. 8 shows a user interface window according to an example of the present disclosure.

The user interface allows a user to specify a search key for the search. An example of a user interface window is shown in FIG. 8. The user specified key may be registered and retrieved at a later time. The search key may include one or more search terms for fields such as printer name, model name, IP address, additional printer device information (for example, such as color printing function entered in the Comment field in FIG. 8), location terms (for example, in the State, City, Address, Building, Floor fields), etc. The user may specify search terms by pull-down selection (for example, when the downward pointing button below the "State" field in FIG. 8 is pressed, a scrollable menu of states may be presented for selection by the user). The selection items are preferably organized hierarchically (for example, when Georgia is selected for the State field, the pull-down menu only presents cities in the state of Georgia). The driver search tool searches the printer database utilizing the user-specified search key and returns a list of matching printers and/or printer drivers. It should be apparent that pull-down and scrollable menus are mentioned above as examples of user interface features and that other well-known user interface features can be provided for entry of search terms.

As discussed above, mobile computers and information terminals can change locations readily, and the user may desire the use of peripherals from the new location. Therefore, a location function may be provided for obtaining location information of terminals. An information terminal might track its own location (for example, using a Global Positioning System card) and provide such location information. Alternatively, location information may be extrapolated from locations of routers, locations provided by wireless networks or other wireless technologies (such as RFID). The driver search tool may use the terminal location information to focus the search.

The user interface displays the list and corresponding printer information (which may be presented as a table), to allow the user to select (for example, by press an "install" button not shown in FIG. 8) one of the printer drivers. Upon selection of a printer driver from the list, the installation application retrieves and downloads the selected printer driver and corresponding installer, and applies the retrieved installer to install the retrieved printer driver on the information terminal.

The installation application may further include an uninstall function. The uninstall function may be invoked through the user interface ("uninstall" buttons not shown in FIG. 8). The installation application may be configured to perform the uninstall function automatically at a predetermined time after installation of the printer driver (so that use of the printer from the information terminal can be time-limited). Alternatively, the installation application may allow a user to specify at a time of installation of the printer driver whether to perform the uninstall function automatically (for example, the user may wish to limit the time duration because he or she will be using the printer for a limited time).

The driver configuration in some instances may be fixed (that is, the driver is installed with the same device options for each user). On the other hand, a function may be provided in the installation application to communicate with the printer for which the driver is to be installed on the information terminal to determine the device options of the printer (for example, finisher type), and then the device driver to be installed is configured according to such device options. For example, some printers may require user ID information for its authentication function, and therefore the user ID obtained for security purposes by the installation application may be inserted automatically in the device driver.

In another example, the installation application may allow the user to modify the driver configuration through the user interface, prior to installation of the printer driver. If no modifications are made through the user interface, the installer applies the default configuration. For example, the default configuration (for each printer or on a case-by-case basis) may provide for the specified printer to be set as the default printer for the information terminal, at a time of installation of the printer driver. Alternatively, the user may be prompted during the installation process whether to set the printer as the default printer.

In any event, the device configuration can of course be modified manually through the wizard that is typically provided by the operating system of the information terminal. However, such manual setting typically requires some insight regarding the configuration of the information terminal.

The device driver is stored as a named file on the information terminal. The installation application can have an auto-naming function. In some instances, the automatically generated name is already used by another file on the information terminal. The user interface can prompt the user whether to overwrite the existing file of the same name or rename the driver file to be installed.

The system may also include functionality for maintaining the printer database. For example, an import function is preferably provided for populating the database with an external data file (for example, CSV file, another standard format file, a customized data file, etc.), and an export function may be provided to allow, for example, archiving or backup of the printer information.

In addition, a database editing tool for customizing and/or editing the database may be provided. The tool is preferably web-enabled to allow an authorized user (for example, with administrator privileges) to modify the data remotely.

In view of the numerous potential threats to information technology security, the system may be configured with assorted security measures. For example, the installation application may require the user to enter login information, in order to determine whether the user has the required authorization to install the driver on the information terminal. The login information may be logged for security reasons as well as for accounting purposes.

In addition, the installation of applications and drivers on an information terminal may require administrator access rights. A number of workaround approaches may be taken to allow a user who does not have administrator privileges for the information terminal to install the printer driver on the information terminal. For example, the security information (for example, user ID and password) for the administrator privileges can be encrypted and embedded in the retrieved installer. As another example, the retrieved printer driver can be pushed onto the remote information terminal (such as by using Microsoft SMS).

The system may further include a database update function for updating printer information if settings of a printer change (for example, a printer has been removed from use, the location of the printer changed, etc.) and updating the drivers stored in the database automatically (such as when the printer manufacturer makes new driver information available). The update function may operate periodically. An additional function may be provided to maintain for each printer driver a log of terminals on which the driver was installed, and update each such terminal with the updated printer driver version (for example, by replacement, by patching, etc.). Alternatively, the update may be pushed to the terminal and installed at a later time (for example when the administrator, after notification of the update, manually installs the update). In addition, the database update function may be coupled to a discovery function which searches the network to obtain new printer information, and the printer database is updated with the new printer information. In addition, newly discovered printers may be registered in an active directory (such as in the example of FIG. 6D).

Figure 9A:
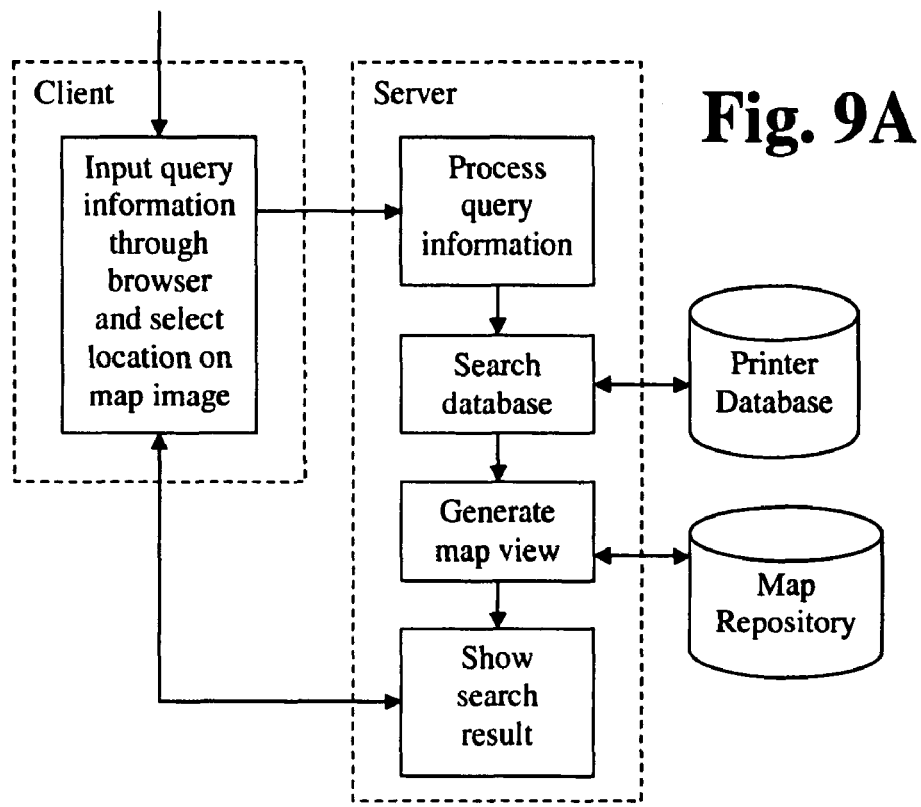
FIG. 9A shows a graphical representation of a work flow, according to an example of the present disclosure.

A workflow of a printing application, according to an example of the present disclosure (FIG. 9A), will now be discussed. A user on a client computer opens a web browser and accesses a web page at a specified address (for example, http://web.server.address/web.installer.url/search.page). The user may be asked to enter login information. The user enters query information (for example, search keys) and/or selects a location on a map image, and sends the query. The printing application processes the query and/or selected map position, sends the query to the printer database to search the database, and formulates a request to the map repository to retrieve an appropriate map image. Based on results from the search of the printer database, and the map image returned by the map repository, the printing application generates a web page utilizing conventional programming techniques, and the web page is transmitted to the client computer for viewing by the user. The user can select a location on the displayed map image to proceed to the next level of map images, or a select a printer indicated on the map image. If a printer is selected, it is determined whether it is necessary to download an appropriate printer driver for installation.

Figure 9B:
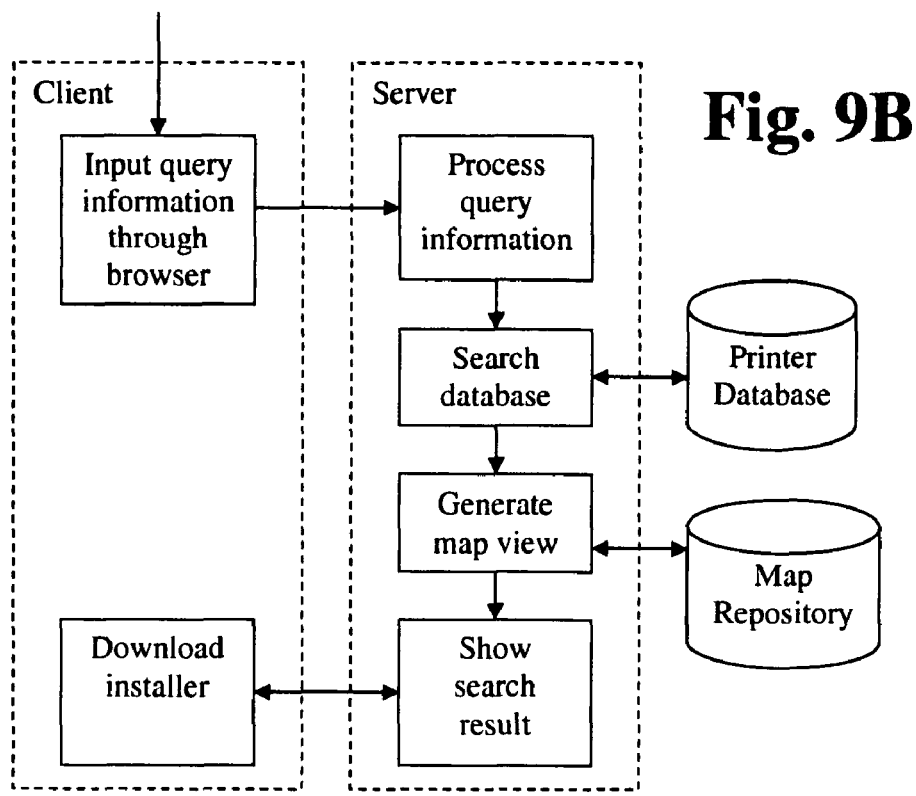
FIG. 9B shows a graphical representation of a work flow, according to another example of the present disclosure.

A workflow for a method for installing a printer driver on a remote information terminal through a network, in another example of the present disclosure (FIG. 9B) will now be discussed. A user on a client computer opens a web browser and accesses a web page at a specified address (for example, http://web.server.address/web.installer.url/search.page), as in the previous example. The user enters search keys and selects a location on a map image, and send the query. The installation application processes the query, and sends the query to the printer database to search the database. The installation application searches the map repository based on the specified location and/or the query. Based on results from the searches of the printer database and the map repository, the installation application generates a web page to show the search results, and the web page is transmitted to the client computer for viewing by the user. The user selects an installer in the search results presented in the web page, and downloads it. The user may be requested to confirm that he or she wishes to proceed with installation of the selected driver, and then runs the installer to install the printer driver.

Management of the printer driver installation system can be provided as a web service, and an example thereof will now be discussed with reference to FIG. 10.

A web service 100 can include a database management component, data import/export component, logging component, printer search component, an LDAP search component, installer package component and a map management. The database management component maintains data in the printer database, including deleting, searching and updating data in the database. In addition, the database management component can, periodically or when necessary, connect to external databases to obtain updated data, for example, through ODBC (Open Data Base Connectivity). The data import/export component allows a user (for example, system administrator) to import a data file (for example, a CSV file) and save the data in the file to the database, and may also allow the user to export data from the database. The logging component automatically logs activity on the system, such as change to the database, driver download, invocation of the installation application, invocation of configuration and management tools, etc. The printer search component searches the network for printers, using, for example, Simple Network Management Protocol (SNMP). The LDAP component is provided for communications with an external printer management system, such as by Lightweight Directory Access Protocol (LDAP) with the server of such a system, or to access an active directory. The installer package component, upon request, loads a printer driver configuration and creates an installer of the printer driver. The installer and driver information are packaged for download to the information terminal. The map management component searches a map repository for appropriate map image based on location information. In addition, as mentioned supra, the map management component can communicate through ODBC or a Web service with external map databases.

The above specific embodiments are illustrative, and many variations can be introduced on these embodiments without departing from the spirit of the disclosure or from the scope of the appended claims. For example, elements and/or features of different illustrative embodiments may be combined with each other and/or substituted for each other within the scope of this disclosure and appended claims.

What is claimed is:

1. A system for installing a printer driver on an information terminal through a network, said system comprising:
   a map repository storing a plurality of map images;
   a printer information database storing printer information corresponding to a plurality of printers, the stored printer information including location information for said plurality of printers; and
   a processor and a computer readable medium tangibly embodying a plurality of instructions executable by the processor to provide an installation application comprising:
      a map management part that receives a specified position of the information terminal from the information terminal, retrieves a map image from said map repository based on the specified position, and retrieves printer location information for one or more printers from said printer information database based on the specified position, and
      a user interface that displays the retrieved map image with indicia on said map image of locations of the respective one or more printers, including a first indicia of a first printer, and recognizes a user selection of the indicia of said respective one or more printers displayed on the map image,
   wherein in response to recognition by the user interface of the user selection of the first indicia of the first printer displayed on the map image, said installation application installs a printer driver corresponding to the user-selected first indicia of the first printer, on said information terminal, and
   wherein said indicia of the locations of the respective one or more printers and the first indicia of the first printer are icons, and said map management part dynamically places icons on said map image based on the retrieved printer location information.

2. The system of claim 1, wherein said map management part is further configured to add additional map images to said map repository.

3. The system of claim 2, wherein said map management part associates said additional map images with user-defined keys.

4. The system of claim 1, wherein said map management part is further configured to maintain a hierarchical structure of map information.

5. The system of claim 1, wherein:
   the user interface is configured for user entry of one or more search terms; and
   said installation application further comprises a database management part configured to retrieve one or more map images from said map repository based on said one or more user-entered search terms.

6. The system of claim 1, wherein said installation application communicates through said network with said map repository to obtain said map image.

7. The system of claim 1, wherein said installation application communicates through said network with a mapping server to obtain additional map information.

8. The system of claim 1, wherein said installation application communicates through said network with said remote information terminal or a location determination device to obtain said specified position.

9. The system of claim 1, wherein said specified position is specified or selected by the user through said interface.

10. The system of claim 5, wherein said database management part is further configured to maintain groupings of printers based on respective network addresses of the printers, and associate said location information with a corresponding grouping.

11. A printing system comprising:
    a plurality of printers; and
    one or more information terminals, each information terminal being configured for user selection of one of the plurality of printers to print a job over a network, and each information terminal comprising:
       a map management part that receives from an information terminal a specified position of the information terminal, retrieves, based on the specified position, a map image from a map repository storing a plurality of map images, and retrieves printer location information for one or more printers, based on the specified position, from a printer information database storing printer information including location information corresponding to said plurality of printers; and
       a user interface that displays the retrieved map image with indicia on said map image of locations of the respective one or more printers, on the information terminals, including a first indicia of a first printer, and recognizes a user selection, on the user terminal, of the indicia of said respective one or more printers displayed on the map image,
    wherein in response to recognition by the user interface of the user selection, on the information terminal, of the first indicia of the first printer displayed on the map image, the system causes the information terminal to install a printer driver corresponding to the user-selected first indicia of the first printer on the information terminal, and
    wherein said indicia of the locations of the respective one or more printers and said first indicia of the first printer are icons, and said map management part dynamically places icons on said map image based on the retrieved printer location information.

12. The printing system of claim 11, wherein said map management part communicates through said network with a mapping server to obtain the map image from said map repository.

13. An information terminal configured for user selection of a printer for printing a print job, comprising:
    a processor and a computer readable medium tangibly embodying a plurality of instructions executable by the processor to provide an installation application comprising:
       a map management part that receives a specified position of the information terminal from the information terminal, retrieves, based on the specified position, a map image from a map repository storing a plurality of map images, and retrieves printer location information for one or more printers, based on the specified position, from a printer information database storing printer information including location information corresponding to said plurality of printers; and a user interface that displays the retrieved map image with indicia on said map image of locations of the respective one or more printers, including a first indicia of a first printer, and recognizes a user selection of the indicia of said respective one or more printers displayed on the map image, wherein in response to recognition by the user interface of the user selection of the first indicia of the first printer displayed on the map image, the installation application installs a printer driver corresponding to the user-selected first indicia of the first printer on the information terminal, and wherein said indicia of the locations of the respective one or more printers and said first indicia of the first printer are icons, and said map management part dynamically places icons on said map image based on the retrieved printer location information.

14. A non-transitory computer readable medium tangibly embodying a plurality of instructions which, when executed by a processor, cause the processor to provide a printing application through a network to an information terminal enabling a user to select a printer for printing a print job, said printing application comprising:

a map management part that receives a specified position of the information terminal from the information terminal, retrieves, based on the specified position, a map image from a map repository storing a plurality of map images, and retrieves printer location information for one or more printers, based on the specified position, from a printer information database storing printer information including location information corresponding to said plurality of printers; and a user interface that displays the retrieved map image with indicia on said map image of locations of the respective one or more printers, including a first indicia of a first printer, and recognizes user selection of the indicia of said respective one or more printers displayed on the map image, wherein in response to recognition by the user interface of the user selection of the first indicia of the first printer displayed on the map image, the printer application installs a printer driver corresponding to the user-selected first indicia of the first printer on the information terminal, and wherein said indicia of the locations of the respective one or more printers and said first indicia of the first printer are icons, and said map management part dynamically places icons on said map image based on the retrieved printer location information.

15. A method for installing a printer driver on an information terminal through a network, said method comprising:

receiving a specified position of the information terminal from the information terminal;

retrieving, based on the specified position, printer location information for one or more printers from a printer information database storing printer information corresponding to a plurality of printers, including locations of the printers;

retrieving, based on the specified position, a map image from a map repository storing a plurality of map images;

displaying the retrieved map image with indicia on said map image of the locations of the respective one or more printers, including a first indicia of a first printer, wherein said indicia of the locations of the respective one or more printers and said first indicia of the first printer are icons;

dynamically placing icons on said map image based on the retrieved printer location information;

recognizing a user selection of the first indicia of the first printer displayed on the map image;

determining an appropriate printer driver corresponding to the user-selected first indicia of the first printer for said information terminal; and installing said printer driver corresponding to the user-selected first indicia of the first printer on said remote information terminal.

16. The method of claim 14, further comprising:
maintaining a hierarchical structure of map information; and
selecting said map image based on said hierarchical structure.

17. The method of claim 15, further comprising:
receiving one or more search terms; and
retrieving one or more map images from said map repository based on said one or more user-entered search terms.

18. The method of claim 15, further comprising:
maintaining groupings of the printers based on respective network addresses of the printers; and
associating said location information with a corresponding grouping.

* * * * *